United States Patent [19]

DeVito

[11] Patent Number: 5,349,760
[45] Date of Patent: Sep. 27, 1994

[54] MEASURING AND CUTTING TOOL

[76] Inventor: Vincent DeVito, 275 Fendale St., Franklin Square, N.Y. 11010

[21] Appl. No.: 124,799

[22] Filed: Nov. 24, 1993

[51] Int. Cl.$^5$ .............................. G01B 3/10; B26B 1/08
[52] U.S. Cl. ................................... 33/760; 33/27.03; 33/668; 33/761; 30/294; 30/300; 30/310
[58] Field of Search ............. 33/27.03, 27.031, 27.032, 33/668, 669, 755, 760, 761, 768, 770; 30/164.95, 290, 294, 300, 310

[56] References Cited

U.S. PATENT DOCUMENTS

| | | | |
|---|---|---|---|
| 838,463 | 12/1906 | Saxton | 33/761 |
| 2,943,392 | 7/1960 | Attridge | 33/27.03 |
| 3,526,964 | 9/1970 | Clark, Jr. | 33/761 |
| 3,731,389 | 5/1973 | King | 33/27.03 |
| 4,044,464 | 8/1977 | Schiess et al. | 30/310 |
| 4,620,368 | 11/1986 | Bowman | 30/294 |
| 4,964,225 | 10/1990 | Waldherr | 33/768 |
| 5,077,911 | 1/1992 | von Wedemeyer | 33/770 |
| 5,231,764 | 8/1993 | Chang | 30/294 |

Primary Examiner—William A. Cuchinski, Jr.
Assistant Examiner—G. Bradley Bennett
Attorney, Agent, or Firm—Michael I. Kroll

[57] ABSTRACT

An improved measuring and cutting tool is provided, which consists of an extensible tape measure. A mechanism for cutting is on a first end of the extensible tape measure. A structure for guiding is on a second opposite end of the extensible tape measure. The guiding structure will allow the cutting mechanism to make quick and accurate cuts into a piece of soft thin material.

7 Claims, 2 Drawing Sheets

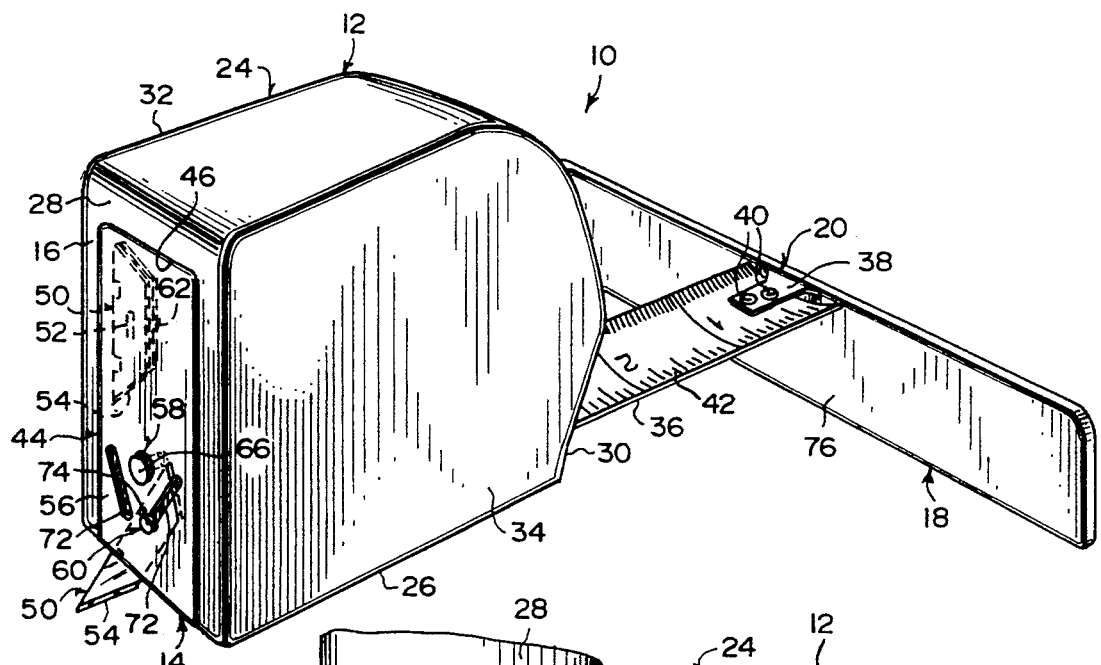
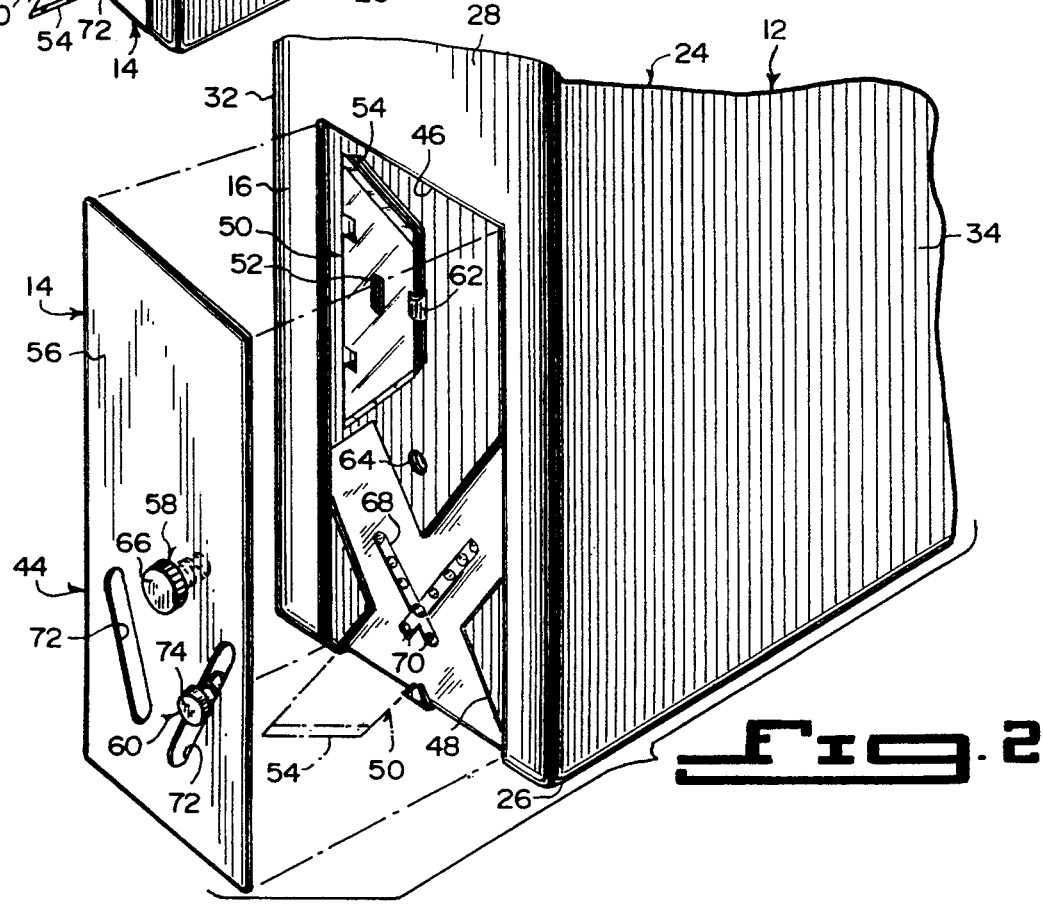

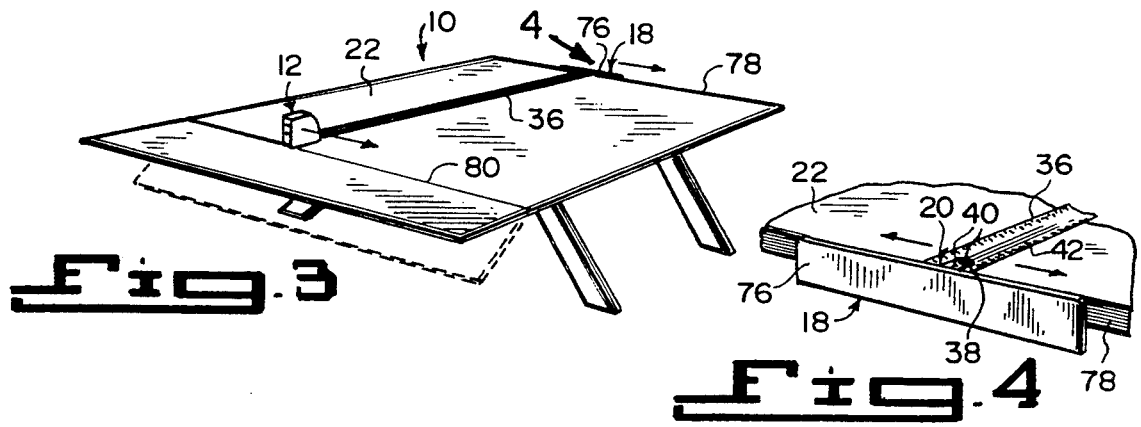
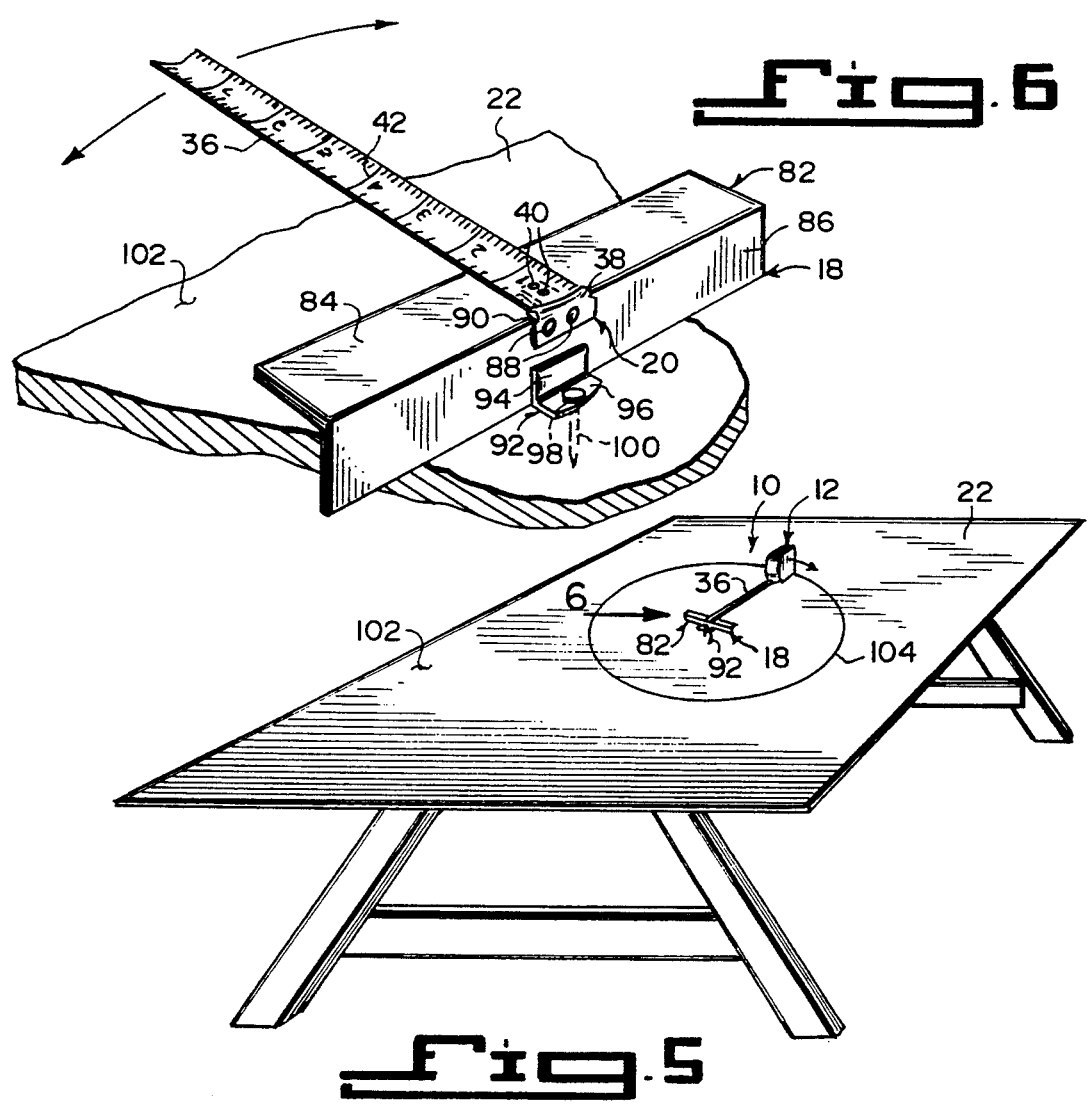

MEASURING AND CUTTING TOOL

BACKGROUND OF THE INVENTION

1. Field of the Invention

The instant invention is the subject matter of Disclosure Document No.: 335612, filed in the PTO on Jul. 22, 1993, and it is respectfully requested that this document be retained beyond the two-year period, so that it may be relied upon as evidence of conception of the invention during the prosecution phase of this application, should the need arise.

The instant invention relates generally to tape measures and more specifically it relates to an improved measuring and cutting tool.

2. Description of the Prior Art

Numerous tape measures have been provided in prior art. For example, U.S. Pat. Nos. numbered 2,646,940 to Volz; 2,649,787 to Kobayashi; 3,965,579 to Woods; 4,999,924 to Shields; 5,010,657 to Knapp; 5,077,911 to Von Wedemeyer; 5,092,057 to Hoenig Sr. and 5,134,784 to Atienza all are illustrative of such prior art. While these units may be suitable for the particular purpose to which they address, they would not be as suitable for the purposes of the present invention as heretofore described.

A measuring rule comprises a casing having an entrance slot. A wind-up spring is normally coiled within the casing and has its outer end extendable through the slot. A flexible coilable measuring blade of greater width than the spring is for connection to the spring and has indicia on one side thereof. A detachable connection between the spring and blade is freely movable through the entrance slot and will not interfere with the coiling of the spring and blade within the casing. An outer end portion of the blade is necked down to substantially the same width as the spring and has a keyhole slot. A blunt arrow-shaped head at the end of the spring is insertable through the keyhole slot from either side of the blade. A narrow strip of bendable metal secured intermediate its ends to the necked down end of the blade transversely thereof, has its ends bendable about the edges of the blade and spring when the head of the spring is inserted through the keyhole slot from the side opposite the indicia.

A measuring tape construction comprising a hollow case having at least two flat marginal wall portions. The wall portions being at right angles to each other. One wall portion having a transverse tape slot. The slot being in close proximity to and substantially parallel with one end of the other wall portion. The other wall portion being provided at its one end with an integral scribing lug. The lug being disposed transversely of the one end flush with the one wall portion and depending at right angles to the other wall portion. The lug extending flush with the opposed longitudinal edges of the tape when the tape is extended beyond the slot. The lower edge of the lug being notched intermediate its ends to provided prominent scratch markers at the respective ends.

A tape rule includes a hollow housing having a slot formed through one peripheral edge portion of the housing. A coil flexible measuring tape within the housing has one end thereof projectable and retractable through the slot. A generally L-shaped anchor member includes a pair of generally right-angularly disposed arms. The arms of the L-shaped anchor member are rigidly interconnected at adjacent ends. A structure is provided for pivotally attaching the terminal end of the free end of the tape to the anchor member for oscillation of the latter relative to the terminal end about an axis disposed transverse to the free end of the tape and is generally mutually perpendicular to the arms of the anchor member. The free end of one of the arms of the anchor member includes an angularly directed terminal end projecting into the included angle formed by the arms. The free end of the right-angularly disposed terminal end is toothed for gripping one side of a structure having an adjacent side along which the free end portion of the tape extends. In this manner the free end of the tape may be hooked about the corner of a structure in order to measure an adjacent side of the structure. Further, by having the L-shaped anchor member pivotally attached to the free terminal end of the tape for oscillation relative thereto the L-shaped anchor member may be positioned, so as to embrace those peripheral side portions of the housing of the tape rule on either side of the slot formed in the housing through which the measuring tape is extendable and protractible. By this manner of storing the L-shaped anchor member when the associated measuring tape is not in use, compact storage of the combination consisting of the tape rule and the L-shaped anchor member is assured.

An improved tape measurement marking device is attached to a measuring tape or built into a conventional tape housing. The device includes a sighting plane for alignment with the desired measurement mark on the tape. A structure is for receiving and directing a hammer blow to a marking blade. The marking blade produces a dimensionless mark precisely at the desired measurement. A void is to place the tape hook in. The void has an edge to hook the tape onto. The edge coincides with the desired measurement mark. When the device is used on an existing tape, mechanism for assembling, sliding and clamping it on the tape are included.

A floating end hook for a measuring tape is disclosed which defines two openings for receipt of first and second rivets for attachment of the end hook to the measuring tape. The openings lie on an axis parallel to an inside surface of an abutting member of the end hook. The positioning of the openings allows the force produced when the end hook impacts the measuring tape housing to be approximately evenly distributed between the first and second rivets. A third opening prevents the end hook from twisting and further ensures that the impacting force is evenly distributed between the first and second rivets.

The invention relates to a roll tape measure comprising an extractable measuring tape. Attached to the free end of the measuring tape is a stop hook, which comprises a stop member which projects approximately at right angles with respect to the measuring tape. That surface of the stop member which faces the measuring tape is coated with friction bodies. These consist, for example, of sapphire crystals having a grain size of approximately 0.12 mm. This coating with friction bodies provides the stop hook with a good grip on the edge of the objects to be measured and with a high degree of resistance to wear.

A tool for locating a pair of points on a horizontal line at a measured distance from a reference point is disclosed. It includes an elongated body carrying a pair of slideable selectively positionable spaced apart locator members. A scale is for indicating the spacing between the indicators members. A bubble gauge is for indicating a horizontal position of the indicator members. A tape measure is mounted for extension perpendicular from the body member for measuring the distance from the indicator members to the reference point at the free end of the extended tape measure.

A measuring tape device includes a housing having a base, a rearward end, a forward end and opposite sides. A wound length of tape is disposed in the housing and is taken out in a direction in line with the base. A first mounting hole is disposed in the housing and mounts a scribing pen in a first, stowed position. A second mounting hole is disposed in the base of the housing at the forward end, transverse the direction of tape take out, and mounts the scribing pin in a second, operative position. The scribing pin in the second operative position has a pointed end extending downwardly from the base.

SUMMARY OF THE INVENTION

A primary object of the present invention is to provide an improved measuring and cutting tool that will overcome the shortcomings of the prior art devices.

Another object is to provide an improved measuring and cutting tool that will allow quick and accurate straight or round cuts into sheet rock, fabric wallpaper and other soft thin materials.

An additional object is to provide an improved measuring and cutting tool that does the job of three tools, (ruler, knife and square) in one operation.

A further object is to provide an improved measuring and cutting tool that is simple and easy to use.

A still further object is to provide an improved measuring and cutting tool that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a perspective view of the instant invention per se.

FIG. 2 is an enlarged perspective view of a portion of the case with the cover exploded therefrom to show the various components of the cutting knife assembly in greater detail.

FIG. 3 is a perspective view showing the instant invention making a straight cut into a piece of soft thin material.

FIG. 4 is a perspective view taken in the direction of arrow 4 in FIG. 3 of a portion thereof, showing the guide member in greater detail against a straight edge of the soft thin material.

FIG. 5 is a perspective view showing the instant invention modified making a round cut in the piece of soft thin material.

FIG. 6 is a perspective view taken in the direction of arrow 6 in FIG. 5 of a portion thereof, showing the guide member in greater detail pivotally retained to the top surface of the soft thin material.

DETAILED DESCRIPTION OF THE PREFERRED EMBODIMENTS

Turning now descriptively to the drawings, in which similar reference characters denote similar elements throughout the several views, FIGS. 1 through 6 illustrate an improved measuring and cutting tool 10, which consists of an extensible tape measure 12. A mechanism 14 for cutting is on a first end 16 of the extensible tape measure 12. A structure 18 for guiding is on a second opposite end 20 of the extensible tape measure 12. The guiding structure 18 will allow the cutting mechanism to make quick and accurate cuts into a piece of soft thin material 22.

The extensible tape measure 12 includes a case 24, having a base 26, a rear wall 28 and a front wall 30, a left side wall 32 and a right side wall 34. A coiled flexible tape 36 within the case 24 is protractible and retractable through the front wall 30 in line with the base 26. An end hook 38 is provided, with a first set of rivets 40 for attaching the end hook 36 to a distal end of the tape 36. The tape 36 includes scale markings 42 therealong. The scale markings 42 can be used to indicate how much of the tape 36 should be protracted and retracted through the front wall 30 of the case 24. The cutting mechanism 14 is an adjustable utility knife assembly 44, built into the first end 16 of the extensible tape measure 12, which is the rear wall 28 of the case 24.

The adjustable utility knife assembly 44 consists of the rear wall 28 of the case 24 having a recessed area 46 extending upwardly from the base 26. An X-shaped track 48 is formed in the recessed area 46 adjacent the base 26. A blade 50 having an elongated aperture 52 and a cutting edge 54 is carried within the X-shaped track 48. The cutting edge 54 can extend at an angle downwardly below the base 26 of the case 24, towards the left wall 32 in a first instance and towards the right wall 34 in a second instance. A cover 56 is sized to fit into the recessed area 46 in the rear wall 28 of the case 24. A fastener 58 is for retaining the cover 58 within the recessed area 56. A component 60 is in the cover for holding the blade 50 within the X-shaped track 48 in an adjustable manner. The cutting edge 54 can be retracted all the way into the track 48 and extends outwardly at varied distances from the bottom of the base 26, to change the depth of the cut into the piece of soft thin material 22.

The adjustable utility knife assembly 44 further includes a clip 62 mounted into the recessed area 46 above the X-shaped track 48, for storing a plurality of the blades 50 therein for future use.

The cover retaining fastener 58 consists of the recessed area 46 having a threaded hole 64 therein. A screw 66 is rotatively mounted within the cover 56, which will threadably engage with the threaded hole 64, when the cover 56 is inserted within the recessed area 46 in the rear wall 28 of the case 24.

The blade holding component 60 includes an inner X-shaped track 68, formed within the X-shaped track 48. The inner X-shaped track 68 has a plurality of spaced apart holes 70 therein. The cover 56 has a pair of angularly positioned slots 72, which line up with the inner X-shaped track 68. A spring biased push button lock 74 can ride in either of the slots 72 through the elongated aperture 52 in the blade 50 and into one of the holes 70 in the inner X-shaped track 68.

The guiding structure 18, as shown in FIGS. 1, 3 and 4, consists of an elongated rectangular plate 76 mounted transversely to the end hook 38 and extends downwardly at a right angle from the tape 36. The elongated rectangular plate 76 can be placed against a straight edge 78 of the piece of soft thin material 22 and manually slide along. This allows the blade 50 of the adjustable utility knife assembly 44 to cut off a portion of the soft thin material 22 opposite from the straight edge along a straight line 80.

The guiding structure, as shown in FIGS. 5 and 6, contains an elongated rectangular angle 82 having a first leg 84 and a second leg 86. A second set of rivets 88 are for attaching the end hook 38 to a center corner 90 of the elongated rectangular angle 82. The first leg 84 extends under the tape 36 and the second leg 86 extends downwardly at a right angle from the tape 36. An L-shaped bracket 92 is provided having a first arm 94 and a second arm 96. The first arm 94 is attached to the second leg 86 of the elongated rectangular angle 82 directly under the end hook 38, with the second arm 96 extending outwardly therefrom.

The second arm 96 has a central aperture 98 therethrough. A nail 100 extends through the central aperture 98 and into a top surface 102 of the piece of soft thin material 22. The second arm 96 of the bracket 92 can manually pivot about the nail 100 allowing the blade 50 of the adjustable utility knife assembly 44 to cut a circle 104 into the soft thin material 22. The soft thin material 22 can be sheet rock, fabric, wallpaper and similar articles.

LIST OF REFERENCE NUMBERS 10 improved measuring and cutting tool
12 extensible tape measure
14 cutting mechanism
16 first end of 12
18 guiding structure
20 second opposite end of 12
22 piece of soft thin material
24 case
26 base of 24
28 rear wall of 24
30 front wall of 24
32 left side wall of 24
34 right side wall of 24
36 tape
38 end hook
40 rivet
42 scale markings on 36
44 adjustable utility knife assembly for 14
46 recessed area in 28
48 X-shaped track in 46
50 blade
52 elongated aperture in 50
54 cutting edge on 50
56 cover
58 cover retaining fastener
60 blade holding component
62 clip
64 threaded hole in 46
66 screw
68 inner X-shaped track in 48
70 hole
72 slot in 56
74 spring biased push button lock in 72
76 elongated rectangular plate for 18
78 straight edge of 22
80 straight line on 22
82 elongated rectangular angle for 18
84 first leg of 82
86 second leg of 82
88 rivet
90 center corner of 82
92 L-shaped bracket
94 first arm of 92
96 second arm of 92
98 central aperture in 96
100 nail
102 top surface of 22
104 circle into 22

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An improved measuring and cutting tool which comprises:
    a) an extensible tape measure, said extensible tape measure including a case having a base, a rear wall, a front wall, a left side wall and a right side wall, a coiled flexible tape within said case protractible and retractable through said front wall in line with said base, an end hook, a first set of rivets for attaching said end hook to a distal end of said tape, and scale markings therealong, so that said scale markings can be used to indicate how much of said tape should be protracted and retracted through said front wall of said case;
    b) means for cutting on a first end of said extensible tape measure, said cutting means being an adjustable utility knife assembly built into said first end of said extensible tape measure which is said rear wall of said case; and
    c) means for guiding on a second opposite end of said extensible tape measure, so that said guiding means will allow said cutting means to make quick and accurate cuts into a piece of soft thin material.

2. An improved measuring and cutting tool as recited in claim 1, wherein said adjustable utility knife assembly includes:
    a) said rear wall of said case having a recessed area extending upwardly from said base;
    b) an X-shaped track formed in said recessed area adjacent said base;
    c) a blade having an elongated aperture and a cutting edge carried within said X-shaped track, so that said cutting edge can extend at an angle downwardly below said base of said case towards said left wall in a first instance and towards said right wall in a second instance;

d) a cover sized to fit into said recessed area in said rear wall of said case;

e) means for retaining said cover within said recessed area; and f) means in said cover for holding said blade within said X-shaped track in an adjustable manner, so that said cutting edge can be retracted all the way into said track and extended outwardly at varied distances from the bottom of said base to change the depth of the cut into the piece of soft thin material.

3. An improved measuring and cutting tool as recited in claim 2, wherein said adjustable utility knife assembly further includes a clip mounted into said recessed area above said X-shaped track for storing a plurality of said blades therein for future use.

4. An improved measuring and cutting tool as recited in claim 3, wherein said cover retaining means includes:

a) said recessed area having a threaded hole therein; and b) a screw rotatively mounted within said cover which will threadably engage with said threaded hole, when said cover is inserted within said recessed area in said rear wall of said case.

5. An improved measuring and cutting tool as recited in claim 4, wherein said blade holding means includes:

a) an inner X-shaped track formed within said X-shaped track, said inner X-shaped track having a plurality of spaced apart holes therein;

b) said cover having a pair of angularly positioned slots which line up with said inner X-shaped track; and c) a spring biased push button lock which can ride in either of said slots through said elongated aperture in said blade and into one of said holes in said inner X-shaped track.

6. An improved measuring and cutting tool as recited in claim 5, wherein said guiding means includes an elongated rectangular plate mounted transversely to said end hook and extends downwardly at a right angle from said tape, so that said elongated rectangular plate can be placed against a straight edge of the piece of soft thin material and manually slide along allowing said blade of said adjustable utility knife assembly to cut off a portion of the soft thin material opposite from the straight edge along a straight line.

7. An improved measuring and cutting tool as recited in claim 5, wherein said guiding means includes:

a) an elongated rectangular angle having a first leg and a second leg;

b) a second set of rivets for attaching said end hook to a center corner of said elongated rectangular angle, so that said first leg extends under said tape and said second leg extends downwardly at a right angle from said tape;

c) an L-shaped bracket having a first arm and a second arm, wherein said first arm is attached to said second leg of said elongated rectangular angle directly under said end hook, with said second arm extending outwardly therefrom, said second arm having a central aperture therethrough; and d) a nail extending through said central aperture and into a top surface of the piece of soft thin material, so that said second arm of said bracket can manually pivot about said nail, allowing said blade of said adjustable utility knife assembly to cut a circle into the soft thin material.

* * * * *